United States Patent
Cohen et al.

(10) Patent No.: US 6,732,214 B1
(45) Date of Patent: May 4, 2004

(54) REDUCING POWER CONSUMPTION AND SIMULTANEOUS SWITCHING IN A BUS INTERFACE

(75) Inventors: Ariel Cohen, Sunnyvale, CA (US); Dror Har-Chen, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/568,739

(22) Filed: May 11, 2000

(51) Int. Cl.[7] .......................... G06F 13/14; G06F 13/42; H03K 17/16
(52) U.S. Cl. .................. 710/305; 710/106; 326/26; 326/31
(58) Field of Search ................ 710/305–307, 710/33, 105, 106; 713/300–340; 326/26, 31

(56) References Cited

U.S. PATENT DOCUMENTS

| | | | | |
|---|---|---|---|---|
| 4,667,337 A | * | 5/1987 | Fletcher | 326/21 |
| 5,874,833 A | * | 2/1999 | Perry et al. | 326/26 |
| 5,890,005 A | * | 3/1999 | Lindholm | 377/41 |
| 5,953,272 A | * | 9/1999 | Powell et al. | 365/201 |
| 6,243,779 B1 | * | 6/2001 | Devanney et al. | 326/21 |

OTHER PUBLICATIONS

"Computer Dictionary", 1997, Microsoft Press, 3rd edition, p. 252.*
"Computer Dictionary", 1997, Microsoft Press, 3rd edition, p. 252.*

* cited by examiner

*Primary Examiner*—Sumati Lefkowitz
*Assistant Examiner*—Trisha Vu
(74) *Attorney, Agent, or Firm*—Christopher P. Maiorana, PC

(57) ABSTRACT

An apparatus comprising a transmit portion and a receive portion. The transmit portion may be configured to present (i) one or more data signals and (ii) a configuration signal, in response to one or more input signals. The receive portion may be configured to receive (i) all of the one or more data signals when operating in a first mode and (ii) less than all of the data signals when operating in a second mode. The first and second modes may be configured in response to the configuration signal.

16 Claims, 1 Drawing Sheet

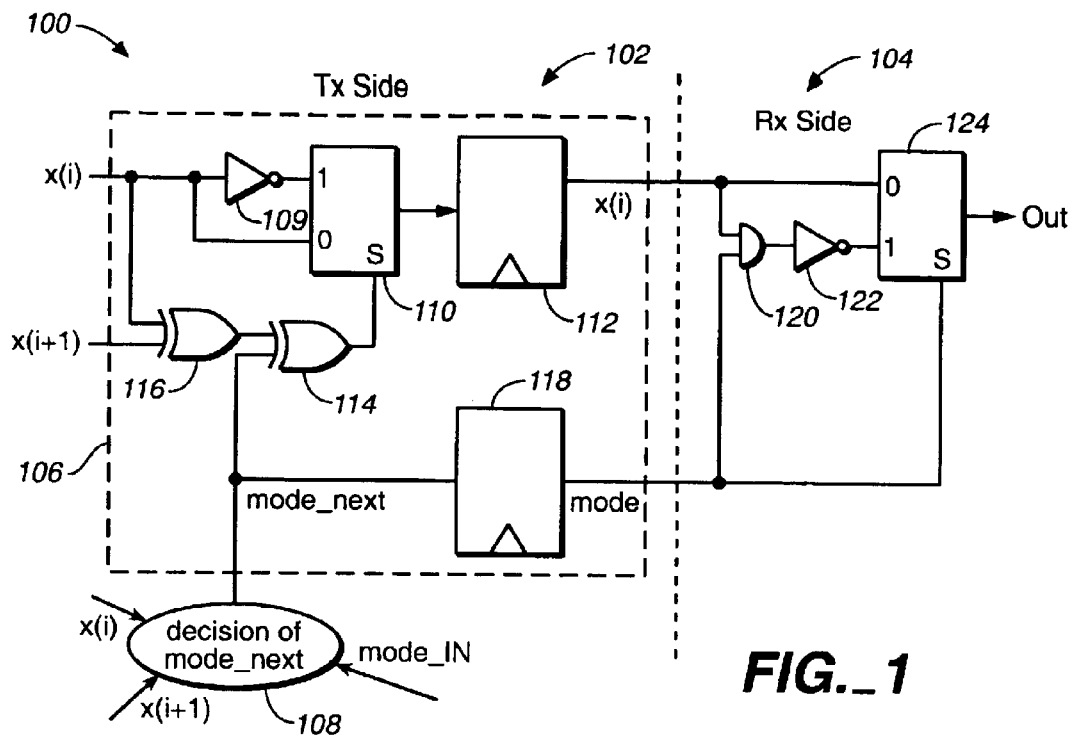
*FIG._1*
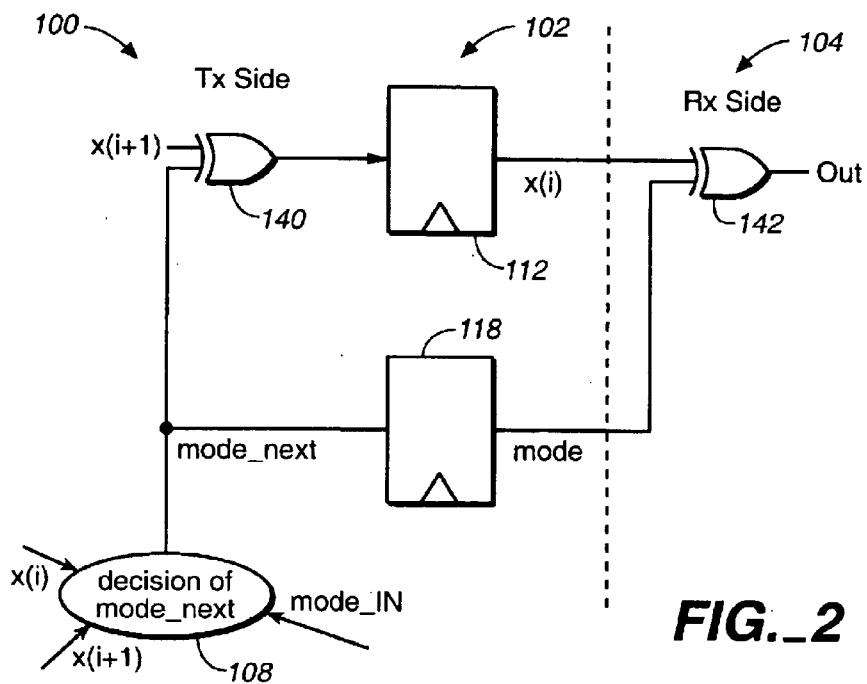
*FIG._2*

REDUCING POWER CONSUMPTION AND SIMULTANEOUS SWITCHING IN A BUS INTERFACE

FIELD OF THE INVENTION

The present invention relates to a method and/or architecture for bus interfaces generally and, more particularly, to a method and/or architecture for reducing power consumption and simultaneous switching in a bus interface.

BACKGROUND OF THE INVENTION

Conventional approaches simply present data on a bus interface. The power consumption and switching overhead is consumed accordingly. Conventional approaches consume (i) more power and (ii) introduce more simultaneous switching than necessary.

SUMMARY OF THE INVENTION

The present invention concerns an apparatus comprising a transmit portion and a receive portion. The transmit portion may be configured to present (i) one or more data signals and (ii) a configuration signal, in response to one or more input signals. The receive portion may be configured to receive (i) all of the one or more data signals when operating in a first mode and (ii) less than all of the data signals when operating in a second mode. The first and second modes may be configured in response to the configuration signal.

The objects, features and advantages of the present invention include providing a method and/or architecture for implementing a bus interface that may (i) replace an existing bus, while maintaining the same frequency, of operation, (ii) reduce power consumption, (iii) improve system noise immunity, (iv) reduce it a number of and/or a voltage level of power pads and/or (v) provide a simplified board layout.

BRIEF DESCRIPTION OF THE DRAWINGS

These and other objects, features and advantages of the present invention will be apparent from the following detailed description and the appended claims and drawings in which:

FIG. 1 is a block diagram of a circuit for implementing a bus interface in accordance with a preferred embodiment of the present invention; and FIG. 2 is a block diagram of an alternate construction of the present invention.

DETAILED DESCRIPTION OF THE PREFERRED EMBODIMENTS

Referring to FIG. 1, a block diagram of a circuit 100 is shown in accordance with a preferred embodiment of the present invention. The circuit 100 may be implemented, in one example, as a bus interface. The circuit 100 generally comprises a transmit side 102 and a receive side 104. The transmit side 102 generally comprises a logic portion (or circuit) 106 and a decision portion 108. The logic block 106 generally comprises an inverter 109, a multiplexer 110, a memory element 112, a gate 114 and a gate 116. The gates 114 and 116 may be implemented, in one example, as exclusive OR gates. However, other gates may be implemented accordingly to meet the design criteria of a particular implementation.

The multiplexer 110 may have: a first input (e.g., "1") that may receive an inverted version of a signal (e.g., x(i)) and a second input (e.g., "0") that may receive the signal x(i). The multiplexer may also receive a control signal at an input (e.g., "S"). The control signal may be presented by the gate 114. The gate 114 may present the control signal in response to an output of the gate 116 and a control signal (e.g., MODE_NEXT). The gate 116 may present the control signal to the gate 114 in response to the signal x(i) and another signal (e.g., x(i+1)). The multiplexer 110 may present a signal to the memory element 112. The memory element 112 may present a signal (e.g., x(i)') to the receive side 104.

The circuit 106 may also comprise another memory cell 118. The memory element 118 may receive the signal MODE_NEXT. The memory element 118 may present a signal (e.g., MODE) in response to the signal MODE_NEXT. The decision block 108 may generate the signal MODE_NEXT. In one example, the signal MODE may be implemented as a mode operation indication signal. However, the signal MODE may be implemented as another appropriate signal in order to meet the criteria of a particular implementation.

The receive side 104 generally comprises a gate 120, an inverter 122 and a multiplexer 124. The gate 120 may be implemented, in one example, as an AND gate. However, other gate types may be implemented in order to meet the criteria of a particular implementation. A first input of the gate 120 may receive the signal x(i). Additionally, the signal x(i) may be presented to a first input (e.g., "0") of the multiplexer 124. A second input of the gate 120 may receive the signal MODE. The gate 120 may present an output to the inverter 122. The inverter may present an inverted output to a second input (e.g., "1") of the multiplexer 124. Additionally, the signal MODE may be presented to a third input (e.g., "S") of the multiplexer 124. The multiplexer 124 may present a signal (e.g., OUT). The signal MODE may control the multiplexing by the multiplexer 124.

When connecting components (e.g., via a bus), whether in the same chip or on the same printed circuit board (PCB), there may be parameters to measure various aspects of the connection (e.g., power consumption, simultaneous switching, etc.). In a low power application, reducing power consumption of the system as much as possible may be an important design criteria. Additionally, reduction of simultaneous switching of bus communications is also important. Reducing simultaneous switching noise generally increases the immunity to noise of the entire system. The present invention generally improves bus communication by reducing power consumption and simultaneous switching.

The present invention may add an extra bit/wire (e.g., to carry the signal MODE) when compared with a conventional bus interface. The signal x(i) may be implemented, in one example, as a multi-bit bus. The bit/wire MODE may be used, in one example, as a flag, indicating a particular bus mode of operation. When the number of toggling bits in the interface 100 is greater then half of the bits currently presented on the bus, a special mode may be implemented by turning on the bit MODE. Additionally, the special mode may toggle the non-toggling bits on the data bits. The special mode may ensure that the number of toggles presented on the interface 100 is not greater then 50% of the total wires (e.g., x(i)) of the interface 100.

An operation of the interface 100 may be shown in TABLE 1:

$$\text{MODE\_NEXT} = \sum_{i=0}^{7} x_i \oplus x[i+1]$$

,where MODE_NEXT=1 when (toggles>4) or (toggles>=4, and mode=1).

In one example, the circuit 100 may be implemented as a memory interface. The memory interface 100 may allow an option of not adding any additional logic on the receiving side 104. The memory interface 100 may save the bit MODE as part of the data to be transmitted. When reading back, the

TABLE 1

| Value | 0x00 | 0x01 | 0xDE | 0xCE | 0xFC | 0xFF |
|---|---|---|---|---|---|---|
| TXed value of bit #7 | 0 | 0 | 0 | 0 | 0 | 0 |
| TXed value of bit #6 | 0 | 0 | 0 | 0 | 0 | 0 |
| TXed value of bit #5 | 0 | 0 | 1 | 1 | 0 | 0 |
| TXed value of bit #4 | 0 | 0 | 0 | 1 | 0 | 0 |
| TXed value of Bit #3 | 0 | 0 | 0 | 0 | 0 | 0 |
| TXed value of Bit #2 | 0 | 0 | 0 | 0 | 0 | 0 |
| TXed value of Bit #1 | 0 | 0 | 0 | 0 | 1 | 0 |
| TXed value of Bit #0 | 0 | 1 | 1 | 1 | 1 | 0 |
| MODE bit | 0 | 0 | 1 | 1 | 1 | 1 |
| last value present on bus (7:0) | | 0000.0000 | 0000.0001 | 0010.0001 | 0011.0001 | 0000.0001 |
| Value to send (7:0) | | 0000.0001 | 1101.1110 | 1100.1110 | 1111.1100 | 1111.1111 |
| Value to present on bus (7:0) | | 0000.0001 | 0010.0001 | 0011.0001 | 0000.0011 | 0000.0000 |
| Value to present on bus (Hexadecimal) | | 0x01 | 0x21 | 0x31 | 0x03 | 0x00 |
| Number of toggles in normal bus i/f | | 1 | 7 | 1 | 3 | 2 |
| Number of toggles in special mode i/f | | 1 | 2 (including the mode bit) | 1 | 3 | 2 |

As demonstrated in TABLE 1, when the bit MODE does not change the number of toggles, the new (e.g., specialized) and old (e.g., conventional) modes may have a similar operation. When the bit MODE changes during operation in the new mode, the interface may reduce toggling of the bits (e.g., x(i)). The reduced toggling may reduce power consumption of the interface 100.

A uniform probability may be used to generate the value to be presented on the bus. The uniform probability may provide the following results (i) an 8-bit interface—~18.28% less toggles (including the mode bit), (ii) a 16-bit interface with 1 mode bit—~14.6% less toggles (including the mode bit), (iii) a 16-bit interface with two mode bits—~18.28% less toggles (including the ii) mode bits), (iv) a 32-bit interface with 1 mode bit—~11.3% less toggles (including the mode bit). In general, the number of toggles may be reduced significantly while maintaining the same operating frequency.

The implementation of the special mode may require additional logic on the transmitting side 102 of the interface 100. However, the receiving side may only require minimal additional logic. The additional logic on the receiving side 104 may be minimal (e.g., the gate 102, the inverter 122 and the multiplexer 124). The transmitting side 102 may require additionally logic (e.g., the decision block 108) to determine a next mode of the interface 100. In one example, the decision block 108 may determine a value of the signal MODE_NEXT as follows:

transmit side 102 may translate the value according to the mode bit MODE.

The interface 100 may provide, in one example, the load and capacitance added/discarded by the circuit 100 may be calculated at the reduced capacitance gate input pins as follows:

Transmitter—5 Full Adders, 16 XOR gates, ~5 gates for the next mode condition=5×3+16×2+5=15+32+5=49 input pins;

Receiver—8 XOR gates=8×2=16 input pins; and

Mode wire—L×4.5×plate capacitance+L×2×fringe capacitance.

When designing in modern technologies with channel length of 0.35 μm (and less), the power consumption of the decision block 108 may be negligible compared to that of the bus. Therefore, when calculating frequency and capacitance for the circuit 100 only the wire capacitance may need to be calculated. Furthermore, additional advancements in technology may allow the logic power consumption of the decision block 108 to be further reduced. The comparison of the consumption of the specialized mode and the convention mode as follows:

"old"—8 bit bus (or 16 bit bus or 32 bit bus)

"new"—9 bit bus (mode bit)+extra logic (or 17 bit bus or 33 bit bus)

Comparison may be done using the following equation for power, frequency and capacitance:

$$EQ1 \, W \propto f^* \, C$$

Comparing two different bus configurations can be done by dividing W1 by W2, where W1 and W2 are the power consumption of the two configurations (e.g., W1=power consumption of old mode and W2=power consumption of new mode).

For an 8-bit bus, using the equation EQ1, a simple calculation of the power ratio using the capacitance and frequency product for both the new and old modes' (Cs and Fs are the special case, Cn and Fn are the normal case) can be done.

The power ratio for the 8-bit bus is:

$$Ratio=(Cs*Fs)/(Cn*Fn)=9/8*(0.817*Fn)/Fn=0.92$$

For a 16-bit bus, using the equation EQ1, a simple calculation the power ratio using the capacitance and frequency product for both the new and old mode can be done (Cs and Fs are the special case, Cn and Fn are the normal case).

The power ratio for the 16-bit bus is:

$$Ratio=(Cs*Fs)/(Cn*Fn)=17/16*(0.854*Fn)/Fn=0.91$$

For a 32-bit bus, using the equation EQ1, a calculation of the power ratio using the capacitance and frequency product for both new and old modes can be done (Cs and Fs are the special case, Cn and Fn are the normal case).

The power ratio for the 32-bit bus is:

$$Ratio=(Cs*Fs)/(Cn*Fn)=33/32*(0.888*Fn)/Fn=0.915$$

However, the logic (e.g., decision block 108) may affect the power consumption ratios in two different ways:

First, the added logic (e.g., for generating the mode bit, decision block 108, and the bus value circuit 100) may slightly reduce the power savings. While the logic is generally not significant, the logic may affect the results. Specific calculations (not shown) generally show a decrease of 1–4% in power savings. The particular decrease of power savings may depend on a length of the bus. Generally, the, longer the bus, the less influence the logic has on power savings.

Second, the power consumption ratio calculations may result in improved power savings, if the common logic of the interface 100 (e.g., flip-flops, random logic, etc.) still toggles according to Fn.

The interface 100 may provide reductions in inner logic power consumption costs. However, the power consumption may not be relevant for board implementations, in which the added logic used for encoding (e.g., internal to the chips on board) is generally negligible. In one example, when referring to board implementations the present invention may provide a significant decrease in inner logic power consumption. The board implemented interface 100 may reduce simultaneous toggles on the bus. Reduced simultaneous switch is generally more significant then inner power consumption when reducing total power consumption.

When implementing the interface 100 running at the same frequency as conventional busses, the power consumption (of the bus interface 100) may be reduced to 0.92 (for 8-bit), to 0.91 (for 16-bit) and/or 0.915 (for 32-bit) of conventional bus power consumption. Other bit-widths generally provide similar reductions.

Implementing the interface 100 at a of board level may improve the system noise immunity, reduce a number power pads and/or simplify the layout of the board. However, implementing the he interface 100 in a chip design generally reduces the power consumption, which is considered to be a significant advantage for handheld consumer applications.

Referring to FIG. 2, a block diagram of an alternate implementation of the present invention is shown. The circuit 100 is shown implementing a gate 140 and agate 142. The gate 140 may be implemented, in one example, as an exclusive OR gate. The gate 140 may be implemented to perform the logic function of the inverter 109, the multiplexer 110, the gate 114 and the gate 116 of FIG. 1. Similarly, the gate 142 may be implemented to perform the logic of the gate 120, the inverter 122 and the multiplexer 124.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first memory element configured to present a first data signal at bus interface;
   a second memory element configured to present a configuration signal conveying a first mode at said bus interface;
   a decision portion (i) configured to generate a second mode in response to said first data signal and a second data signal and (ii) connected to said second memory element to transfer said second mode;
   a first logic gate configured to perform a logical operation on said second data signal while said first data signal is being presented; and a second logic gate connected to said decision portion to receive said second mode for said configuration signal, wherein an output of said first logic gate is connected to an input of said second logic gate.

2. The apparatus according to claim 1, wherein said decision portion is further connected to said first logic gate to transfer said second mode.

3. The apparatus according to claim 2, wherein an output of said first logic gate is further connected to an input of said first memory element.

4. The apparatus according to claim 1, wherein said second mode for said configuration signal corresponds to said second data signal.

5. The apparatus according to claim 1, wherein said configuration signal comprises a single bit.

6. The apparatus according to claim 1, further comprising a receive portion configured to receive said first data signal and said configuration signal.

7. The circuit according to claim 1, further comprising a multiplexer (i) controlled by said second logic gate and (ii) having an output connected to an input of said first memory element.

8. The circuit according to claim 7, further comprising an inverter having an output coupled to a first input of said multiplexer and an input coupled to a second input of said multiplexer.

9. The circuit according to claim 1, wherein said first memory element is directly connected to said bus interface and said second memory element is directly connected to said bus interface.

10. An apparatus comprising:

means for presenting a first data signal at a bus interface from a first memory element;

means for presenting a configuration signal conveying a first mode at said bus interface from a second memory element;

means for (i) generating a second mode in response to said first data signal and a second data signal and (ii) connected to said second memory element to transfer said second mode;

means for performing a logical operation on said second data signal while said first data signal is presented; and a logic gate connected to means for generating a second mode to receive said second mode for said configuration signal, wherein an output of said means for performing a logical operation is connected to an input of said logic gate.

11. A method for reducing power consumption and simultaneous switching in a bus interface, comprising the steps of:

(A) presenting a first data signal at said bus interface from a first memory element;

(B) presenting a configuration signal at said bus interface conveying a first mode from a second memory element;

(C) generating a second mode in response to said first data signal and a second data signal;

(D) transferring said second mode directly to said second memory element;

(E) performing a first logical operation on said second data signal while said first data signal is presented; and performing a second logical operation using said second mode of said configuration signal and a result of step (E).

12. The method according to claim 11, further comprising the step of:

presenting said configuration signal conveying said second mode and said second data signal at said bus interface after presenting said first data signal.

13. The method according to claim 11, wherein step (E) performs said first logical operation in response to said second mode of said configuration signal.

14. The apparatus according to claim 11, wherein said configuration signal comprises a single bit.

15. The method according to claim 11, further comprising the step of:

multiplexing a third signal in response to a result of said second logical operation.

16. The method according to claim 11, further comprising the step of:

selectively inverting said first data signal presented at said bus interface in response to said configuration signal.

* * * * *